(12) United States Patent
Mosley et al.

(10) Patent No.: US 7,126,207 B2
(45) Date of Patent: Oct. 24, 2006

(54) CAPACITOR WITH CARBON NANOTUBES

(75) Inventors: Larry E. Mosley, Santa Clara, CA (US); Quat T. Vu, San Jose, CA (US); Yuegang Zhang, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/089,922

(22) Filed: Mar. 24, 2005

(65) Prior Publication Data
US 2006/0214262 A1    Sep. 28, 2006

(51) Int. Cl.
H01L 51/30    (2006.01)
(52) U.S. Cl. .................. 257/532; 257/E51.04; 977/742
(58) Field of Classification Search ........ 977/742–752, 977/932, 948; 257/532, 534–535, E51.04
See application file for complete search history.

(56) References Cited

U.S. PATENT DOCUMENTS 4,383,957 A * 5/1983 Yamakawa et al. ......... 264/663
6,515,325 B1 * 2/2003 Farnworth et al. .......... 257/296

OTHER PUBLICATIONS

Dresselhaus et al. Carbon Nanotubes. Phaysics Today. Jan. 1998.*

Qiang Fu, et al., Selective Coating of Single Wall Carbon Nanotubes with Thin SiO2 Layer, Nano Letters, 2002, vol. 2, No. 4, pp. 329-332.
Ya-Ping Sun, et al., "Functionalized Carbon Nanotubes: Properties and Applications", Acc. Chem. Res., 2002, vol. 35, No. 12, pp. 1096-1104.
S. Niyogi, et al., "Chemistry of Single-Walled Carbon Nanotubes", Acc. Chem. Res., 2002, vol. 35, No. 12, pp. 1105-1113.
Ming Zheng, et al., "DNA-assisted dispersion and separation of carbon nanotubes", Nature Materials, May 2003, vol. 2, pp. 338-342.
Vasilios Georgakilas, et al., "Organic Functionalization of Carbon Nanotubes", J. Am. Chem. Soc., 2002, vol. 124, No. 5, pp. 760-761.
Alexander Star, et al., "Preparation and Properties of Polymer-Wrapped Single-Walled Carbon Nanotubes", Angew. Chem. Int. Ed. 2001, 40, No. 9, pp. 1721-1725.

* cited by examiner

Primary Examiner—N. Drew Richards
Assistant Examiner—Sean Fletcher
(74) Attorney, Agent, or Firm—Schwabe, Williamson & Wyatt, P.C.

(57) ABSTRACT

In one embodiment, a capacitor comprises a substrate defining a first electrical terminal; a catalyst layer disposed on the substrate; a plurality of carbon nanotubes disposed on the catalyst layer; a dielectric layer disposed over the plurality of carbon nanotubes; and a conductive layer disposed on the dielectric layer and defining a second electrical terminal.

15 Claims, 10 Drawing Sheets

CAPACITOR WITH CARBON NANOTUBES

BACKGROUND

1. Technical Field

Embodiments of the present invention are related to the field of electronic devices, and in particular, to capacitors.

2. Description of Related Art

A decoupling capacitor may be embedded in an integrated circuit (IC) package adjacent to a die (chip) or included in a capacitor interposer disposed between the IC package and a die. The decoupling capacitor stores charge to provide a stable power supply by decoupling the supply from high frequency noise, damping power overshoots when the die is powered up, and damping power droops when the die begins to use power. High capacitance density is needed in many applications such as for decoupling the power supply for integrated circuits of the die. Inductance between the capacitor and the die slows response time of the capacitor to voltage changes. By embedding the capacitor in close proximity to the die, this inductance may be reduced.

Carbon nanotubes (CNTs) are hollow graphite tubules having a diameter of generally from several nanometers to several tens of nanometers. The tubules may be capped at their ends. Single-wall carbon nanotubes (SW-CNT) and multi-wall carbon nanotubes (MW-CNT) have relatively great mechanical strength and relatively high electrical and thermal conductivities. SW-CNTs may be formed essentially of $sp^2$-hybridized carbon atoms typically arranged in hexagons and pentagons. MW-CNTs are nested single-wall carbon cylinders and possess some properties similar to SW-CNTs. Various methods have been applied to the synthesis of SW-CNTs and MW-CNTs, including the use of catalysts to initiate growth of some CNTs.

DETAILED DESCRIPTION OF ILLUSTRATIVE EMBODIMENTS

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention.

Figure 1:
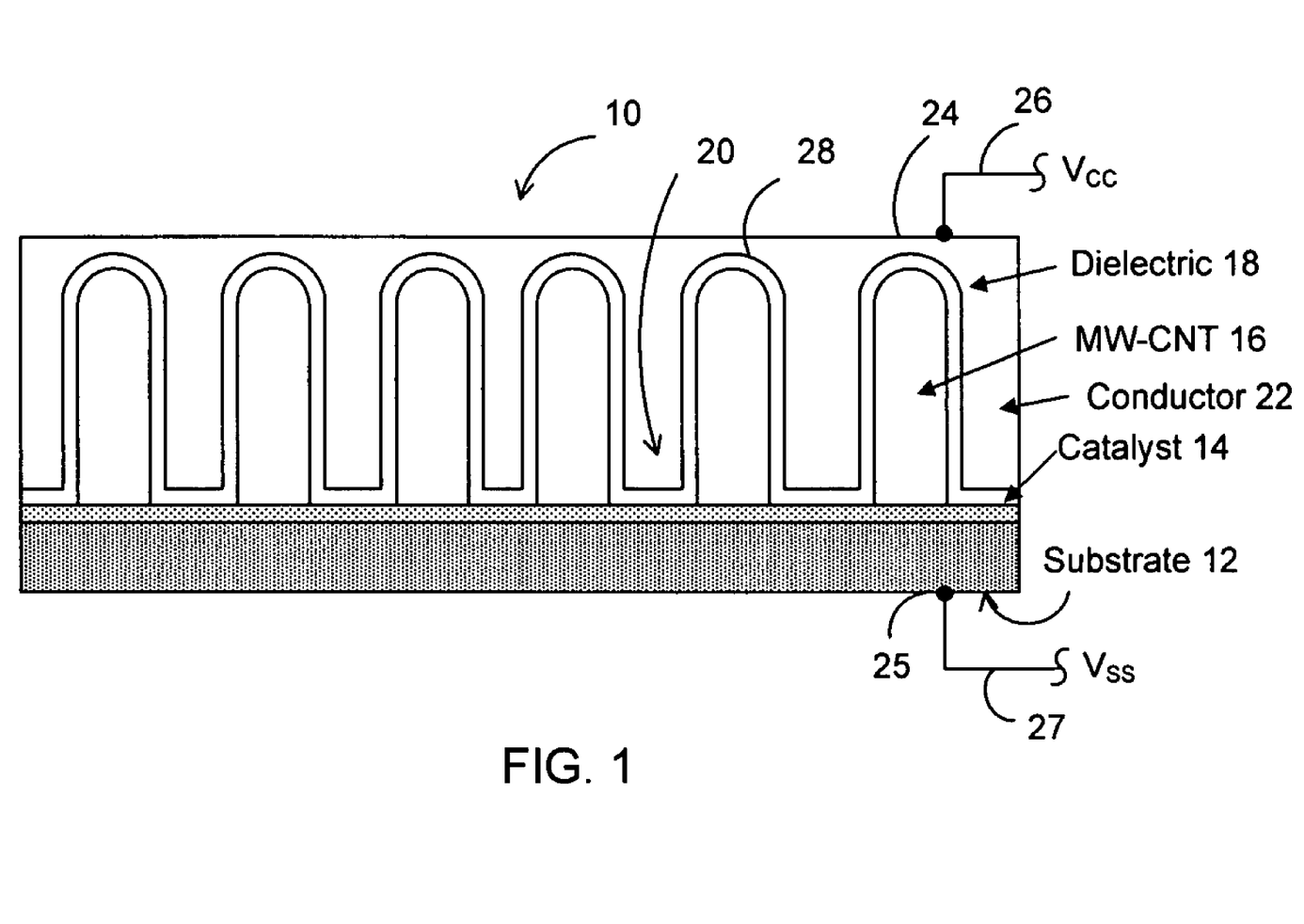
FIG. 1 is a fragmented, enlarged cross-sectional view of a capacitor, according to one embodiment of the present invention.

Referring to FIG. 1, there is shown a capacitor 10 having a multilayer structure with a relatively high volumetric density. The capacitor 10 may include: a substrate 12, a catalyst layer 14 disposed on the substrate 12; a plurality of Carbon NanoTubes (CNTs) 16 formed on the catalyst layer 14; and a dielectric layer 18 disposed on the CNTs 16 and on exposed portions of the catalyst layer 14 in the gaps 20 between the CNTs 16; and a top conductive layer 22 disposed over the dielectric layer 18. The CNTs 16 may be electrically interconnected by the catalyst layer 14 and the substrate 12. The substrate 12, catalyst layer 14, and the CNTs 16 may form one electrode of the capacitor 10 and the conductive layer 22 may form another electrode of the capacitor 10, with the dielectric layer 18 electrically separating the two electrodes. The top conductive layer 22 may form an electrical terminal 24 for the capacitor 10. The substrate 12 may form a second electrical terminal 25 for the capacitor 10. Hence, the capacitor 10 has two conductive electrodes providing the desired capacitance when an electrical potential is applied. In one embodiment, the electrical terminals 24 and 25 may be electrically coupled to a power supply (supply voltage Vcc) and a ground (ground voltage Vss) by a pair of electrical connections (paths) 26 and 27, respectively. In another embodiment, the terminal 24 may be coupled to ground and the terminal 25 may be coupled to the power supply.

The CNTs 16 may be a multi-wall CNT (MW-CNT) or a single-wall CNT. The plurality of CNTs 16 may create a relatively large surface area with a relatively thin dielectric layer to provide a relatively high capacitance density similar to aluminum and tantalum capacitors. In one embodiment, the CNTs 16 may be ordered in a pattern to be spaced-apart from each other in a relatively uniform manner. In another embodiment, the pattern may be random. The relatively high conductivity of the CNTs 16 may make the equivalent series resistance (ESR) of at least one terminal relatively low. It may also be possible to control the location and length of the CNTs 16 and thereby assisting in controlling the capacitance density. The catalyst layer 14, which may act as a seed layer for the CNTs 16, may be formed of nickel (Ni), cobalt (Co), iron (Fe), and titanium (Ti).

The dielectric layer 18 may be a thin, insulating, conformal layer formed of a dielectric material 28. In one embodiment, the dielectric material 28 may be a linear dielectric material, such as silicon dioxide. A linear dielectric material may not have large variations with changes in the applied electric field or changes in the temperature that may occur with ceramic materials. A linear dielectric material may exhibit relatively high breakdown strength. The thickness of the dielectric layer 18, when formed of a linear dielectric material, may be reduced down to 1 nanometer (nm), with the thickness being controlled through the deposition process to be described hereinafter. In one embodiment, the dielectric layer 18, when formed of the linear dielectric material, may have a thickness in the 5–10 nm range. This range of thickness may reduce the leakage current that may occur in thin oxide layers, while still maintaining the high capacitance density. In another embodiment, it may be possible to use a hi-k ceramic material for the dielectric layer 18. In this embodiment, the capacitance density of the hi-k ceramic layer may be substantially greater than that achieved by use of a linear dielectric material. The deposited conductive layer 18 may be made of a conductive material, such as an electrically conductive metal or an electrically conductive polymer.

Figure 2:
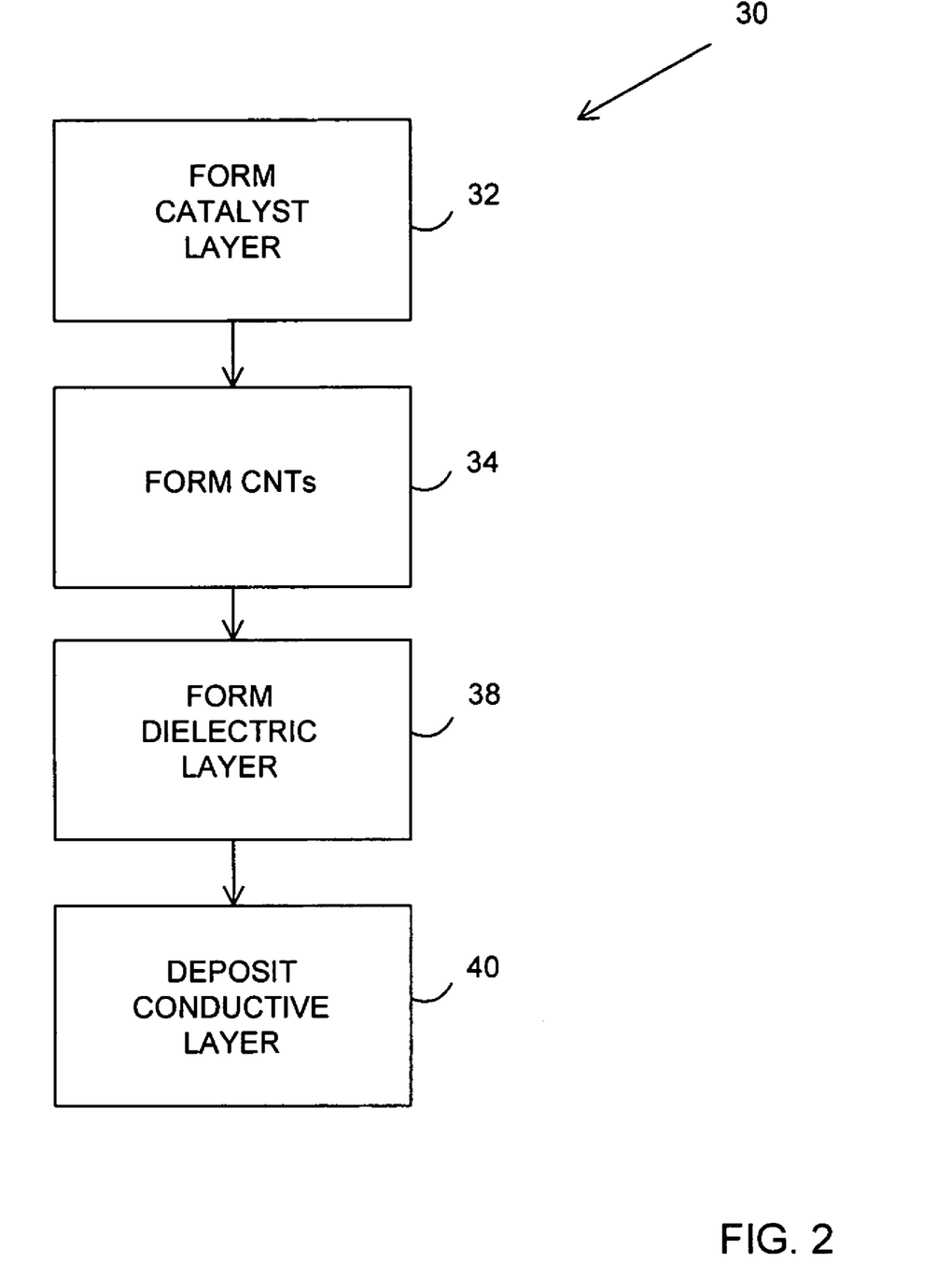
FIG. 2 is a process flow diagram of a fabrication procedure, according to one method of the invention, for forming the capacitor of FIG. 1, according to one embodiment of the invention.
Figure 3:
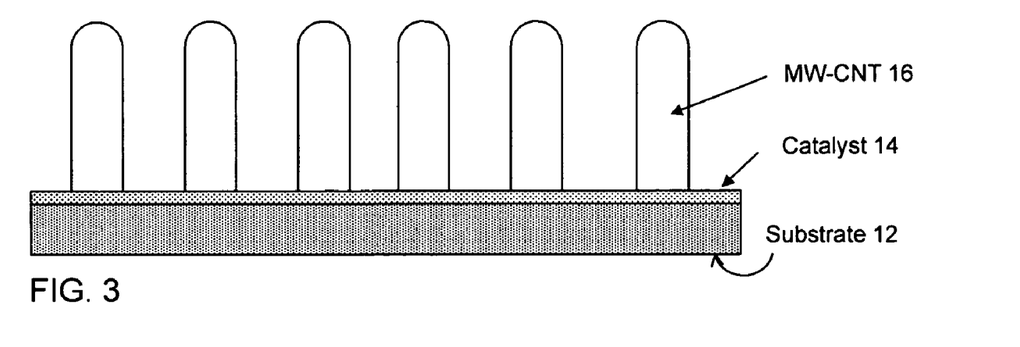
FIG. 3 illustrates one of the stages of the fabrication procedure of FIG. 2 for fabricating the capacitor of FIG. 1, according to one embodiment of the invention.
Figure 4:
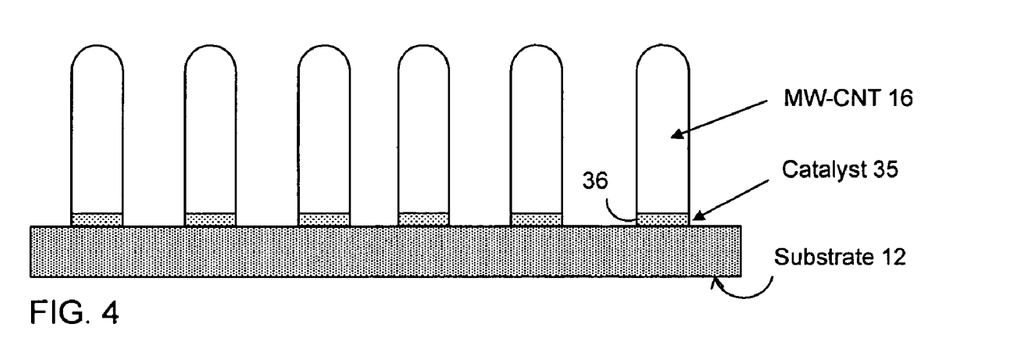
FIG. 4 illustrates an alternative stage to the stage of FIG. 3 for fabricating the capacitor of FIG. 1, according to one embodiment of the invention.
Figure 5:
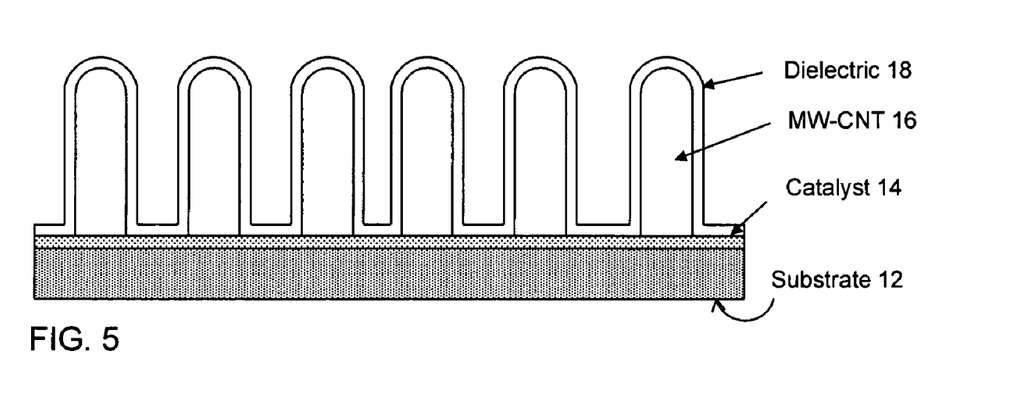
FIG. 5 illustrates another one of the stages of the fabrication procedure of FIG. 2 for fabricating the capacitor of FIG. 1, according to one embodiment of the invention.

Referring to FIG. 2, there is shown a process flow 30, in accordance to one method of the present invention, for fabricating the capacitor 10 of FIG. 1. In general, the process flow 30 may include depositing the dielectric layer 18 on the surface of CNTs 16 or functionalizing the CNTs 16 with the dielectric material, followed by depositing the conductive layer 22 to form the terminal 24. The process flow of FIG. 2 will now be described in detail, with the FIGS. 3, 4, and 5 showing stages of the process flow prior to the completed capacitor 10 shown in FIG. 1. It should be understood that other process flows also may be used to fabricate the capacitor 10. Likewise, the process flow 30 also may be used to fabricate embodiments of capacitors other than the capacitor 10.

Referring to FIGS. 2 and 3, at a stage 32 of FIG. 2, a solid catalyst layer 14 may be formed in an uninterrupted layer over an upper surface of the substrate 12. Next, at a stage 34 of FIG. 2, a plurality of ordered and spaced-apart CNTS 16 may be formed on the surface of the catalyst layer 14. Although MW-CNTs are shown in FIG. 3, SW-CNTs also may be used. The substrate 12 and catalyst layer 14 may form a good electrical contact with the CNTs 16 so as to form one terminal of the capacitor 10.

Referring to FIGS. 2 and 4, an alternative stage to the previously-described stage 32 may be undertaken. In this alternative stage, a catalyst layer 35 may be formed into islands 36 of catalyst material, either randomly or by patterning the catalyst layer 14 of FIG. 3. This may provide for better growth of the CNTs 16. The remaining stages of the process flow 30 will be illustrated using the solid catalyst layer 14. However, these remaining stages also may use the catalyst layer 35 with the islands 36.

Referring to FIGS. 2 and 5, at a stage 38 of FIG. 2, the dielectric layer 18, such as silicon dioxide, may be formed by depositing the dielectric material over the CNTs 16 and the exposed portions of the catalyst layer 14 in the gaps 20 between the CNTs 16. As previously mentioned, the thickness of the dielectric layer 18 may be reduced to a thickness of about 1 nm. This thickness may be controlled through the deposition process for the dielectric layer 18. In one embodiment, the dielectric layer 18 may be in the 5–10 m range in order to reduce the leakage current. With this method of forming the dielectric layer, the covalent bonds of the CNTs 16 may not broken, so that single or multi-wall CNTs 16 may be used without losing their relatively high electrical conductivity. As previously described, other dielectric materials may be used for the dielectric layer 18; hence, the silicon dioxide mentioned herein is but one example of a dielectric material. In the alternative method using the catalyst layer 35 of FIG. 3 comprising a plurality of islands 36, the dielectric material may be deposited over the CNTs 16 and exposed portions of the substrate 12 in the gaps 20 between the CNTs 16.

Referring to FIGS. 1 and 2, after the dielectric layer 18 is formed, at a stage 40 of FIG. 2, the conductive layer 22 may be deposited over the dielectric layer 18 to form the other terminal of the capacitor 10. The completed capacitor 10 is shown in FIG. 1.

With respect to the dielectric layer 18 of FIG. 1, there is another way to form the dielectric layer 18 on the CNTs 16 of FIG. 1, which is to "functionalize" the surface of the CNTs 16. It has been demonstrated that molecules can be attached to the surface of CNTs 16. This attraction may be used to form the dielectric layer on the CNTs 16. One possible dielectric material that may be used is a non-conducting polymer, but other materials may also be used. In this case, the covalent bonds of the surfaces of the CNTs 16 may be broken, but by using multi-wall CNTs, the relatively high conductivity of the internal layers of the multi-wall CNTs may remain, even though the relatively high conductivity may be lost for the outer walls of the CNTs.

One approach for continuing the dielectric layer 18 in areas between the CNTs 16, so as avoid shorts between power and ground in these areas, may include forming a polymer film between the CNTs 16. In this embodiment, the dielectric layer 18 may be formed from two portions, the functionalized outer wall on the CNTs 16 and the polymer film between the CNTs 16. To achieve this, a modified process flow shown in FIG. 6 will be described hereinafter, wherein a mask is disposed between the CNTs 16 to complete the dielectric layer 18 of FIG. 1. As will be described in this flow process, a surfactant mask in the form of a copolymer film may be formed on the catalyst layer, which may take the form of an aluminum plate, for example. Irradiation degrades one of the copolymers and hydrolysis may remove the degraded polymer so as to leave a plurality of spaced apart pores in the polymer film in which the CNTs may be formed. In another embodiment, it may be possible to functionalize the areas between the CNTs 16.

Figure 6:
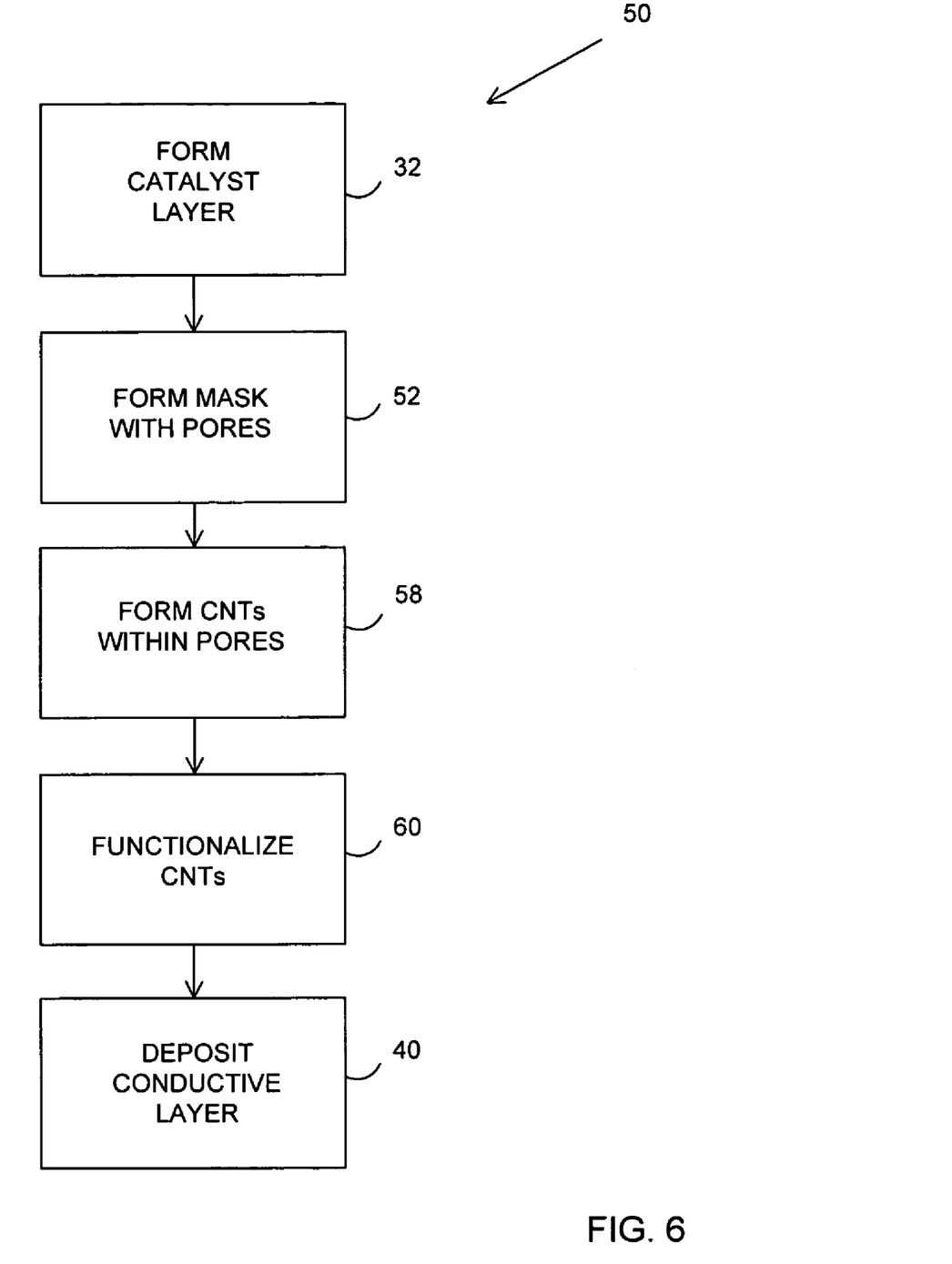
FIG. 6 is a process flow diagram of another fabrication procedure, according to another method of the invention, for forming the capacitor of FIG. 1, according to one embodiment of the invention.

Referring to FIG. 6, there is shown a process flow 50, in accordance with another method of the present invention, for fabricating the capacitor 10 of FIG. 1. Those stages of the process flow which remain the same as those shown in FIG. 2 will retain the same reference numerals. Successive stages of fabrication of a capacitor 10 using the process flow 50 of FIG. 6 are shown in FIGS. 7A and 7B, FIGS. 8A and 8B, and FIG. 9.

Figure 7A:
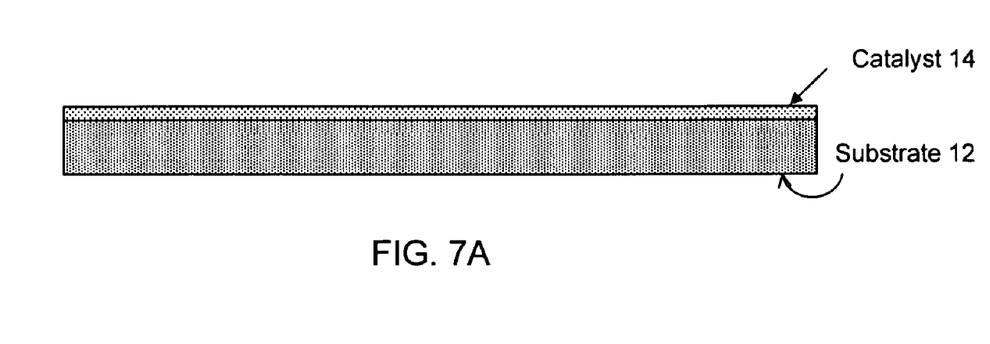
FIGS. 7A and 7B show a side and a top view, respectively, of a stage of the fabrication procedure of FIG. 6, according to one method of the invention.
Figure 7B:
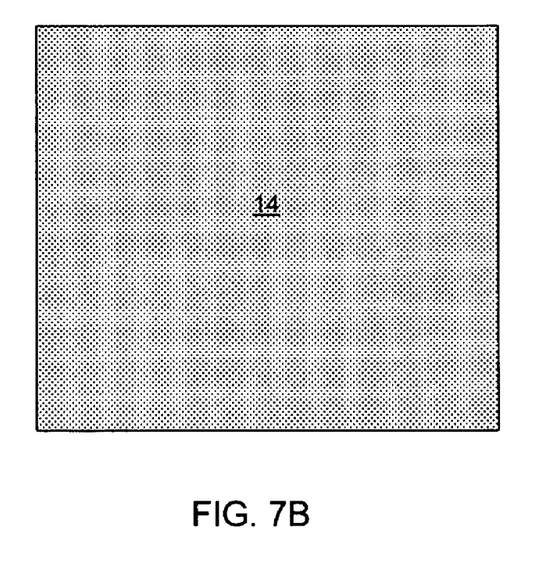

Referring to FIG. 6 and FIGS. 7A and 7B, at a stage 32 of FIG. 6 (same as in FIG. 2), the solid catalyst layer 14 may be deposited in an uninterrupted layer over an upper surface of the substrate 12.

Figure 8A:
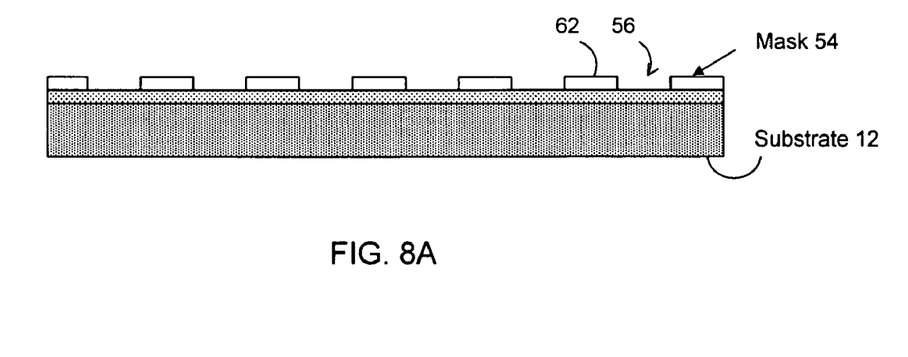
FIGS. 8A and 8B show a side and a top view, respectively, of another stage of the fabrication procedure of FIG. 6, according to one method of the invention.
Figure 8B:
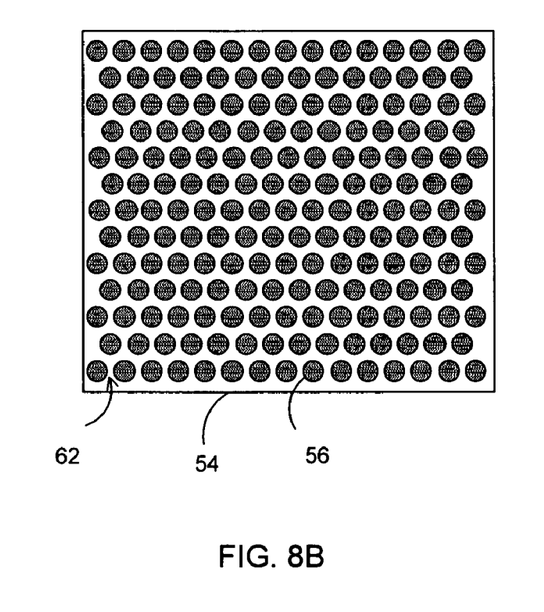

Referring to FIG. 6 and FIGS. 8A and 8B, at a stage 52 of FIG. 6, a mask 54 with a plurality of pores 56 may be formed on the catalyst layer 14. It has been demonstrated that surfactants such as block copolymers may be used to form templates having nano-sized pores. In one embodiment, polystyrene (PS) and poly(methylmethacrylate) (PMMA) polymers may be used for the mask 54. Under irradiation, the PMMA block may degrade, whereas the PS block may not. A hydrolysis process may be used to remove the degraded PMMA. The result is a pattern of spaced apart pores 56 in the remaining film layer of the mask 54, as illustrated in FIGS. 8A and 8B.

Figure 9:
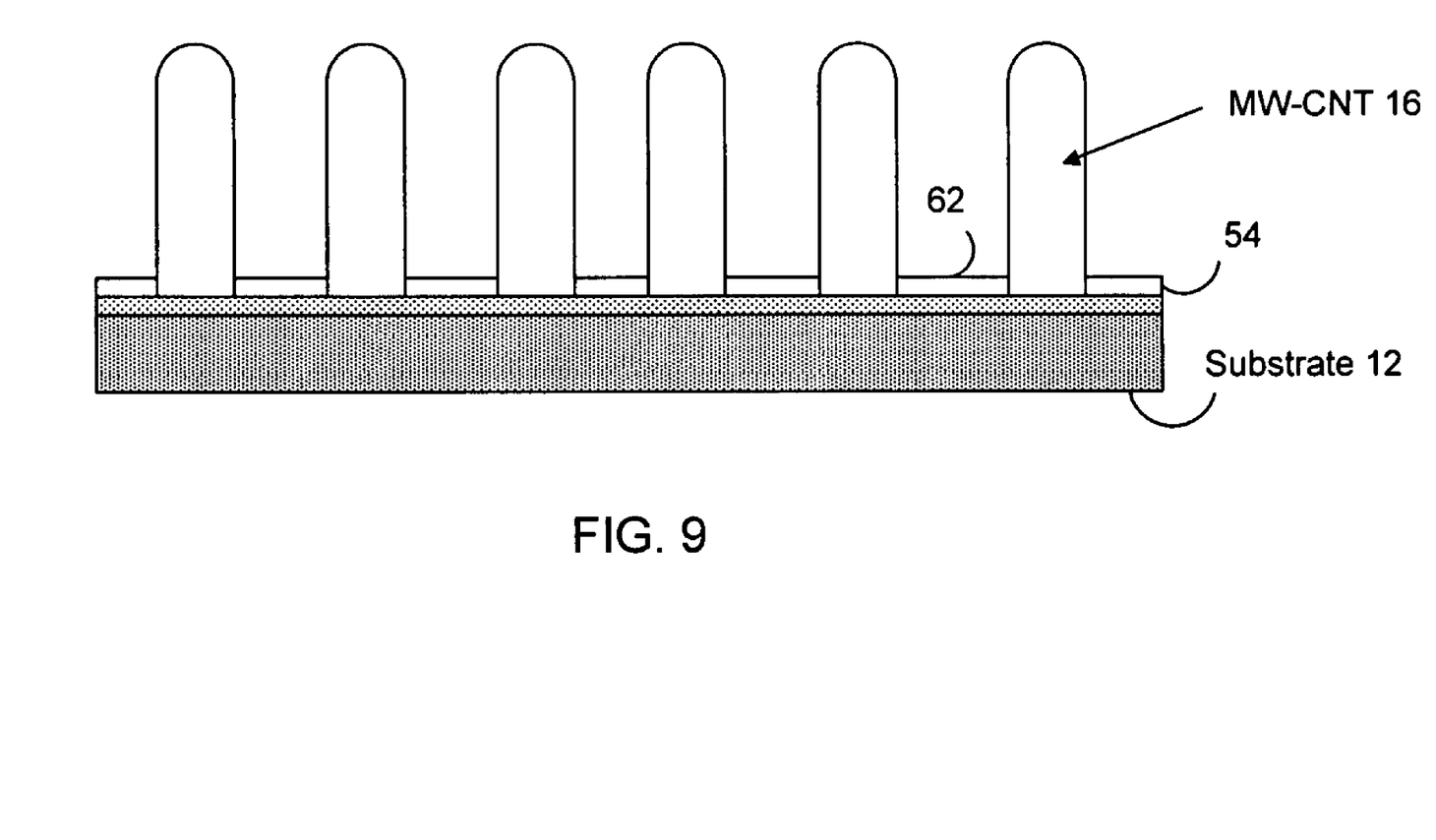
FIG. 9 shows a side view of another stage of the fabrication procedure of FIG. 6, according to one method of the invention.

Referring to FIG. 6 and FIG. 9, at a stage 58 of FIG. 6, CNTs 16 may be grown only within the pores 56 of the mask 54. The diameters of the pores 56 may be controlled such that the pores 56 have similar diameters as the CNTs 16.

Referring to FIG. 6, at a stage 60, the CNTs 16 may be functionalized to form part of the dielectric layer 18 shown in FIG. 1 over the outside of the CNTs 16. This portion of the dielectric layer 18 of FIG. 1 may combine with mask portions 62 of the mask 54 which extend between the CNTs 16 to form the complete dielectric layer 18 of FIG. 1. Hence, there are no openings between the CNTs 16 for the two electrodes (terminals) of the capacitor 10 of FIG. 1 to allow for an electrically short. At a stage 40 (remains the same as in FIG. 2), the conductive layer 22 may be deposited over the dielectric layer 18 to form the other terminal of the capacitor 10. The completed capacitor 10 is shown in FIG. 1, but with the dielectric layer 18 now having two portions, the functionalized outer layers of the CNTs and the mask portions between the CNTs.

Figure 10:
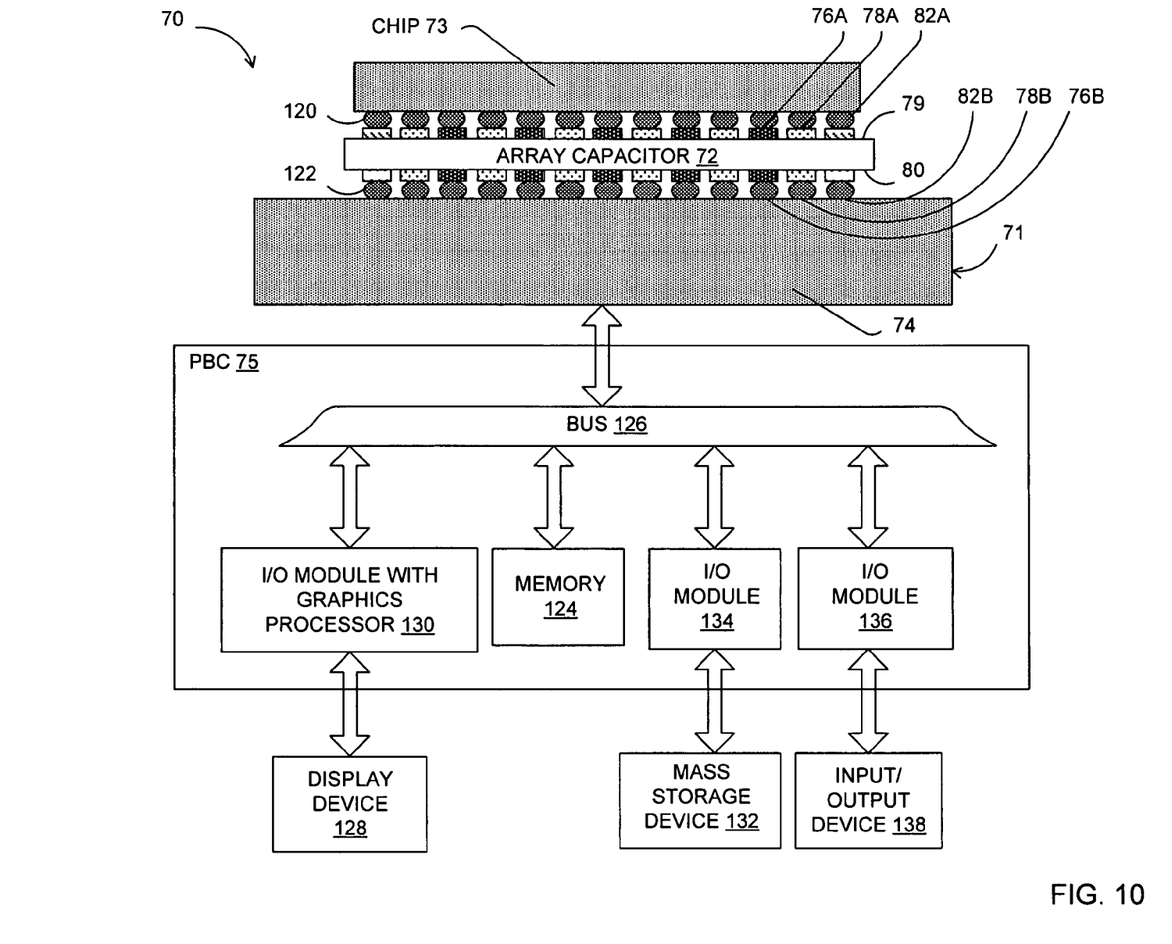
FIG. 10 is a block diagram of a system including an IC package having an array capacitor, according to another embodiment of the present invention.

Referring to FIG. 10, the system 70 illustrates one of many possible systems in which an array capacitor 72, according to another embodiment of the present invention, may be incorporated. As will be described hereinafter, the array capacitor 72 is essentially the capacitor 10 of FIG. 1 modified to have a plurality of power, ground and input/output (I/O) contacts. The system 70 may include an integrated circuit (IC package) 71 having an IC chip or die 73, a chip carrier 74, and the array capacitor 72. The IC package 71 may be mounted to a printed circuit board (PCB) 75.

The array capacitor 72 of FIG. 10 may be referred to as an array capacitor for the array of power, ground and I/O contacts. The array capacitor 72 may be embedded in the IC package 71 in a number of different ways. In one embodiment of the IC package 71 (as illustrated in FIG. 10), the array capacitor 72 may a capacitor interposer wherein the array capacitor 72 is interposed between the die 73 and the chip carrier 74 via solder bumps. In another embodiment of the IC package 71, the array capacitor 72 may be embedded in the chip carrier 74 as layers of the chip carrier 74. In yet another embodiment of the IC package 71, the capacitor array 72 may be modified to have power, ground and I/O contacts on just one side of the capacitor array and be mounted by solder bumps to the bottom of the chip carrier on the side opposite to the side having the chip. In addition to the embodiments of the IC package 71 incorporating the array capacitor 72, the IC package 71 may incorporate the capacitor 10 of FIG. 1 as a discrete capacitor mounted to or in the chip carrier with one power and one ground terminal. Other locations for an array capacitor 72 or a discrete capacitor 10 of FIG. 1 in the computer system 70 may be used. The capacitors 10 and 72 of FIGS. 1 and 10, respectively, may have their electrodes coupled to power and ground so as to function as a decoupling capacitor.

Referring to FIG. 10, the array capacitor 72 may have a plurality of electrical power contacts 76A and 76B on opposed sides that are commonly coupled to one of the electrodes of the capacitor 72. The array capacitor 72 may further include a plurality of electrical ground contacts 78A and 78B on opposed sides that are commonly coupled to the other electrode of the array capacitor 72. The power and ground contacts 76A and 78A may be positioned on a chip-side 79 of the array capacitor 72 and power and ground contacts 76B and 78B may be positioned on a carrier-side 80 of the array capacitor 72. The power contacts 76B on the carrier-side 80 may be coupled to a power supply (not shown) via the chip carrier 74 and the PCB 75 and the ground contacts 78B on the carrier-side 80 may be coupled to the ground via the chip carrier 74 and the PCB 75. The power and ground contacts 76A and 78A on the chip-side 79 may be coupled to the chip 73. The array capacitor 72 may also have on its opposed sides 79 and 80 a plurality of input/output (I/O) signal contacts 82A and 82B.

Figure 11:
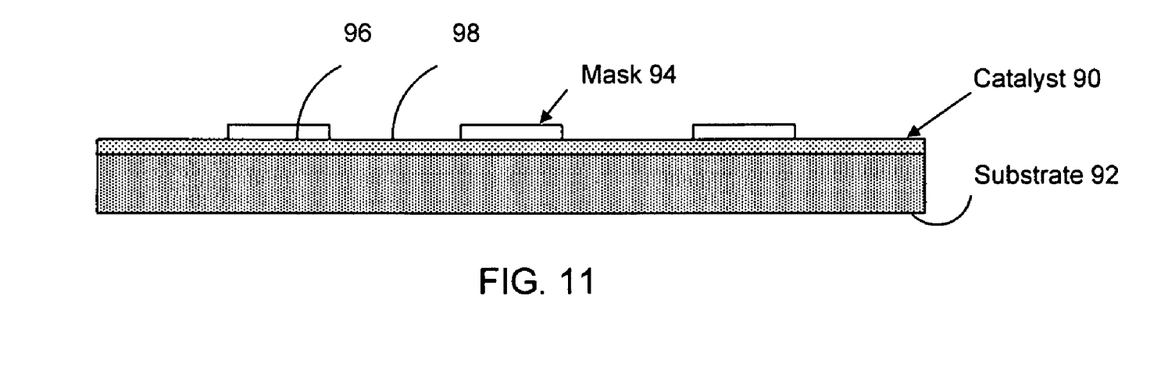
FIG. 11 shows a side cross-sectional view of a stage of the fabrication of the array capacitor of FIG. 10, according to one embodiment of the invention.
Figure 12:
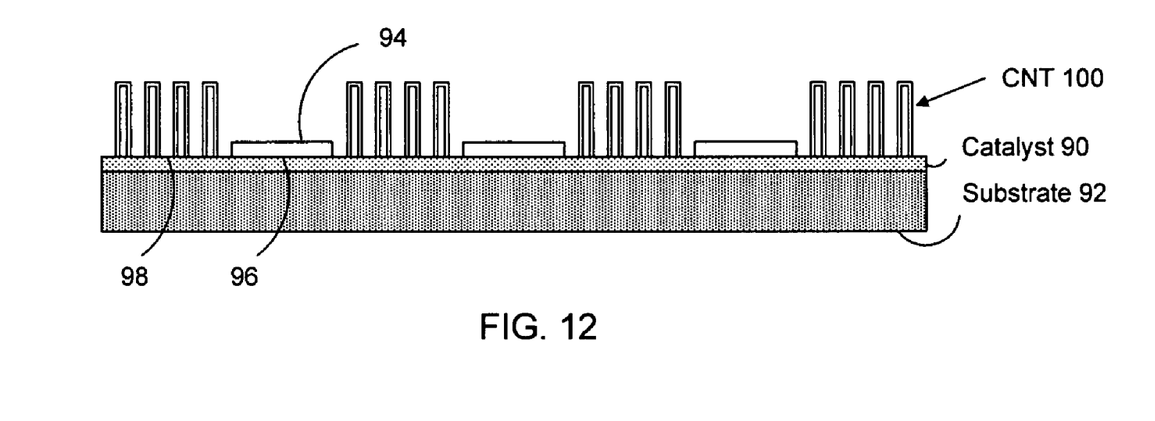
FIG. 12 shows a side cross-sectional view of another stage of the fabrication of the array capacitor of FIG. 10, according to one embodiment of the invention.
Figure 13:
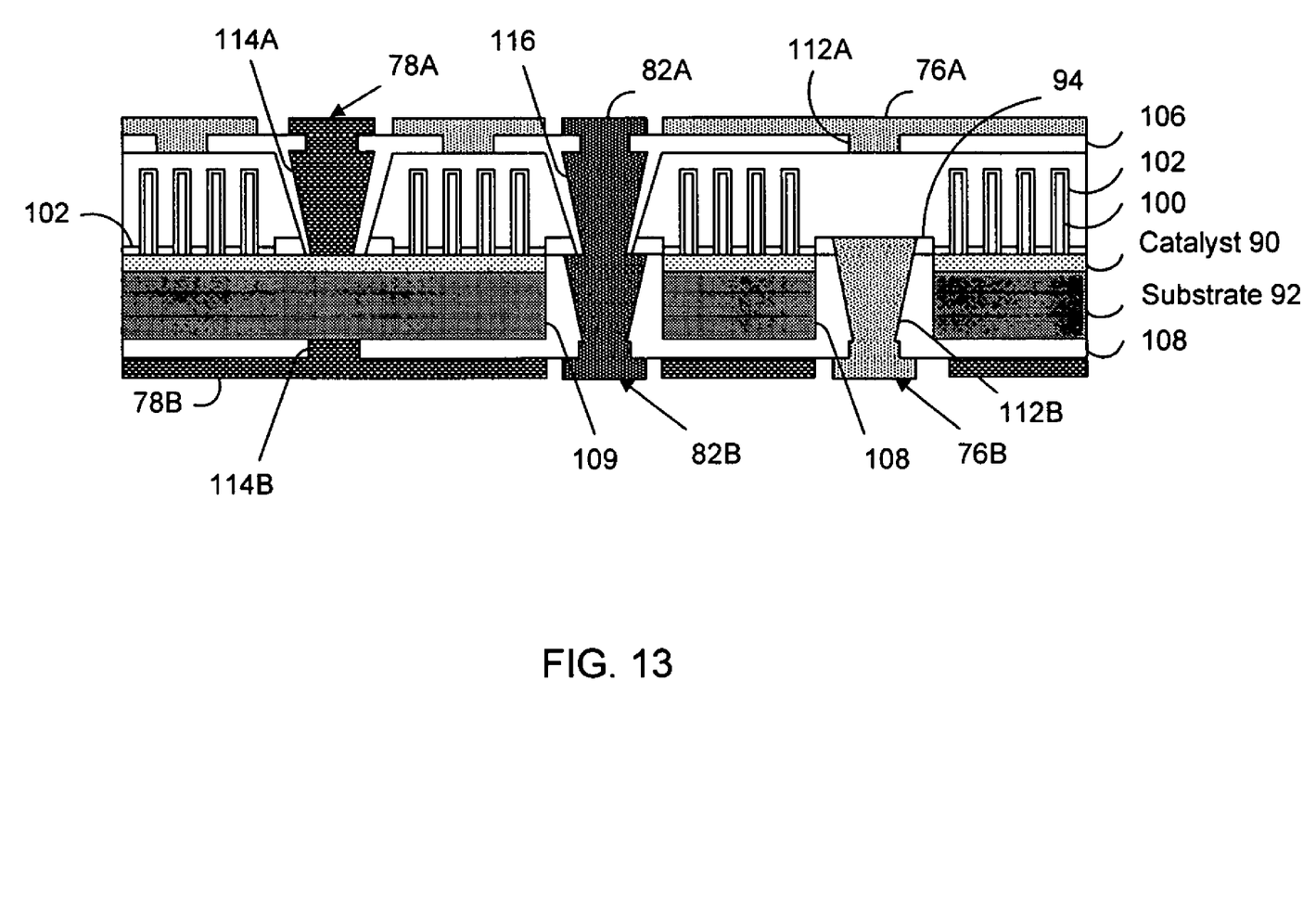
FIG. 13 shows a side cross-sectional view of a complete array capacitor of FIG. 10, according to one embodiment of the invention.

Referring to FIGS. 11–13, fabrication of the array capacitor 72 is shown in three cross-sectional views of a progressive build-up of an enlarged illustrative segment of the array capacitor 72, with the completed array capacitor 72 being shown in FIG. 13. In general, in comparison to the process flow of FIG. 2, protected areas may be formed on the catalyst layer so that no CNTs are grown on these protected areas. Thereafter, these protected areas may be used for the placement of vias for the power, ground and I/O contacts. In the segment of array capacitor 72 shown in FIG. 13, there is illustrated a pair of power contacts 76A and 76B, a pair of ground contacts 78A and 78B, and a pair of I/O contacts 82A and 82B.

Referring to FIG. 11, a solid catalyst layer 90 may be formed in an uninterrupted layer over an upper surface of a substrate 92. A mask 94 may be placed over the catalyst layer 90 to form a plurality of protected areas 96 and unprotected areas 98 on the surface of the catalyst layer 90. Referring to FIG. 12, a plurality of spaced-apart CNTs 100 may be formed on the surface of the catalyst layer 90 in the unprotected areas 98, but not in the protected areas 96. The CNTs 100 may be MW-CNTs or SW-CNTs. The substrate 92 and catalyst layer 90 may form a good electrical contact with the CNTs 100 so as to form one electrode of the array capacitor 72. A dielectric layer 102 is deposited over the CNTs 100, the mask 94, and any exposed areas of the catalyst layer 90. A conductive layer 104 may be deposited over the dielectric layer 102, which forms the other electrode of the array capacitor 72.

Referring to FIG. 13, a dielectric layers 106, such as polyimide, may be deposited over the conductive layer 104. Holes 108 may be formed in the substrate 92 and the catalyst layer 90 to expose the conductive layer 104 deposited in the regions above protected areas. Holes 109 may be formed in the substrate 92 and the catalyst layer 90 to connect with regions above protected areas that have the dielectric layer 106. Another dielectric layer 110 may deposited on the substrate 92 and in the holes 108 and 109. The dielectric layers 106 and 110 are used to isolate conductive areas. Next via drilling and filing allows for the placement of vias to form power, ground and I/O connections. More specifically, the pair of power contacts 76A and 76B may be electrically connected by a pair of vias 112A and 112B, the pair of ground contacts 78A and 78B may be electrically connected by a pair of vias 114A and 1114B, and the pair of I/O contacts 82A and 82B may be electrically connected by a via 116. The conductive I/O path formed by the via 116 between the I/O contacts 82A and 82B is electrically isolated from the power and ground paths in that the via 116 traverses both electrodes of the capacitor 72 without electrical contact. The via 76B extends through the dielectric material of the layer 110 in the hole 108 and the via 116 extends through the dielectric material of layer 110 in hole 109.

Referring back to FIG. 10, a further description of the system 70 is provided. Solder bumps 120 may be used to provide electrical connections between the contacts 76A, 78A, and 82A on the chip-side 79 of the array capacitor 72 and the chip 73. Solder bumps 122 may be used to provide electrical connections between the contacts 76B, 78B, and 82B on the carrier-side 80 of the array capacitor 72 and the chip carrier 74. The chip carrier 74 may be attached to PCB 75 by solder balls (not shown). In this way electrical connections between IC chip 73 and PCB 75 are made through the array capacitor 72.

Referring to FIG. 10, the IC chip 73 may be a processor chip and PCB 75 may be a motherboard. In addition to the chip carrier 74, the motherboard PCB 75 may have mounted thereon a main memory 124 and a plurality of input/output (I/O) modules for external devices or external buses, all coupled to each other by a bus system 126 on the motherboard PCB 75. More specifically, the system 70 may include a display device 128 coupled to the bus 126 by way of an I/O module 130, with the I/O module 130 having a graphical processor and a memory. The I/O module 130 may be on the PCB 75 as shown in FIG. 10 or on a separate expansion board. The system 70 may further include a mass storage device 132 coupled to the bus 126 via an I/O module 134. Another I/O device 136 may be coupled to the bus 126 via an I/O module 138. Additional I/O modules may be included for other external or peripheral devices or external buses.

Examples of the memory 124 include, but are not limited to, static random access memory (SRAM) and dynamic random access memory (DRAM). Examples of the mass storage device 132 include, but are not limited to, a hard disk drive, a compact disk drive (CD), a digital versatile disk driver (DVD), a floppy diskette, a tape system and so forth. Examples of the input/output devices 136 may include, but are not limited to, devices suitable for communication with a computer user (e.g., a keyboard, cursor control devices, microphone, a voice recognition device, a display, a printer, speakers, and a scanner) and devices suitable for communications with remote devices over communication networks (e.g., Ethernet interface device, analog and digital modems, ISDN terminal adapters, and frame relay devices). In some cases, these communications devices may also be mounted on the PCB 75. Examples of the bus system 126 include, but are not limited to, a peripheral control interface (PCI) bus, and Industry Standard Architecture (ISA) bus, and so forth. The bus system 126 may be implemented as a single bus or as a combination of buses (e.g., system bus with expansion buses). Depending upon the external device, internal interfaces of the I/O modules may use programmed I/O, interrupt-driven I/O, or direct memory access (DMA) techniques for communications over the bus 126. Depending upon the external device, external interfaces of the I/O modules may provide to the external device(s) a point-to-point parallel interface (e.g., Small Computer System Interface—SCSI) or point-to-point serial interface (e.g., EIA-232) or a multipoint serial interface (e.g., FireWire).

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A capacitor, comprising:
    a substrate defining a first electrical terminal;
    a catalyst layer disposed on the substrate;
    a plurality of carbon nanotubes disposed on the catalyst layer and electrically coupled through the catalyst layer to the substrate;
    a dielectric layer disposed over the plurality of carbon nanotubes; and
    a conductive layer disposed on the dielectric layer and defining a second electrical terminal.

2. The capacitor according to claim 1, wherein the plurality of carbon nanotubes are disposed in a spaced-apart relationship to each other; and the conductive layer is disposed on the dielectric layer which is disposed on plurality of carbon nanotubes and the conductive layer is further disposed on the dielectric layer which is disposed between the spaced-apart carbon nanotubes.

3. The capacitor according to claim 1, wherein the catalyst layer is a solid catalyst layer.

4. The capacitor according to claim 3, wherein the dielectric layer also is disposed over a plurality of portions of the catalyst layer located between the plurality of carbon nanotubes.

5. The capacitor according to claim 1, wherein the catalyst layer includes a plurality of islands of catalyst material on the substrate, with a plurality of gaps between the plurality of islands defining a plurality of exposed portions of the substrate.

6. The capacitor according to claim 5, wherein the dielectric layer also is disposed over the plurality of exposed portions of the substrate.

7. The capacitor according to claim 1, wherein each of the plurality of carbon nanotubes include a functionalized outer wall.

8. The capacitor according to claim 7, wherein a polymer film is disposed between the plurality of carbon nanotubes on the catalyst layer.

9. The capacitor according to claim 1, wherein the dielectric layer is formed of a linear dielectric material.

10. The capacitor according to claim 1, wherein the dielectric layer is formed of a ceramic dielectric material.

11. The capacitor according to claim 1, wherein each of the plurality of carbon nanotubes is a single-wall carbon nanotube.

12. The capacitor according to claim 1, wherein each of the plurality of carbon nanotubes is a multi-wall carbon nanotube.

13. The apparatus according to claim 1, wherein the plurality of carbon nanotubes are disposed in a spaced-apart relationship to each other; the dielectric and the conductive layers are disposed in a substantially encapsulating relationship to a plurality of portions of the plurality of spaced-apart carbon nanotubes extending from the catalyst layer and the dielectric and the conductive layers are further disposed between the plurality of spaced-apart carbon nanotubes.

14. A capacitor, comprising: a substrate defining a first electrical terminal; a catalyst layer disposed on the substrate; a plurality of carbon nanotubes disposed on the catalyst layer; a dielectric layer disposed over the plurality of carbon nanotubes; a conductive layer disposed on the dielectric layer and defining a second electrical terminal; a plurality of power contacts electrically coupled by a plurality of first vias to a selected one of the catalyst layer and the conductive layer; and a plurality of ground contacts electrically coupled by a plurality of second vias to the other one of the catalyst layer and the conductive layer.

15. The capacitor according to claim 14, wherein a portion of a selected one of the plurality of first vias and the plurality of second vias are disposed in a plurality of regions of dielectric material, with the plurality of regions being disposed between a plurality of groups of the carbon nanotubes.

* * * * *